Aug. 15, 1939.  S. BUCHER  2,169,485
ICE CREAM MOLD
Filed May 17, 1937
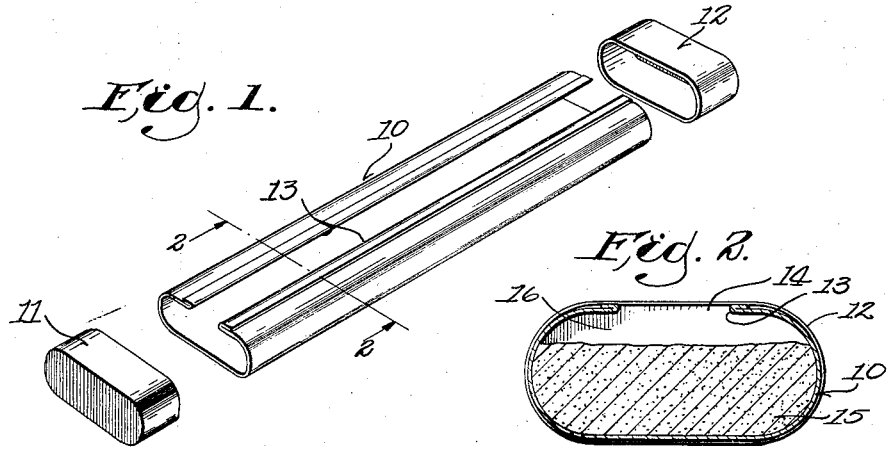
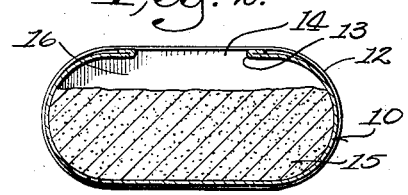
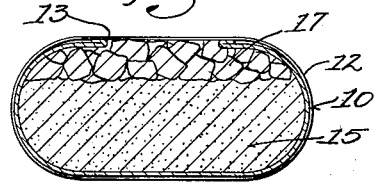
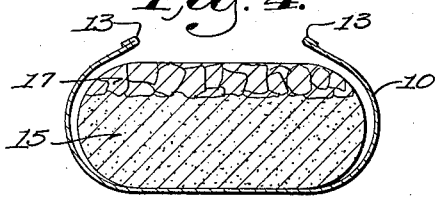
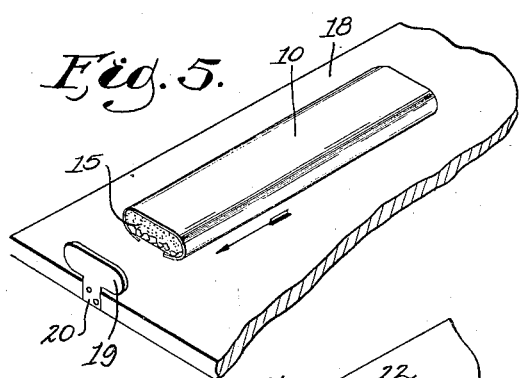
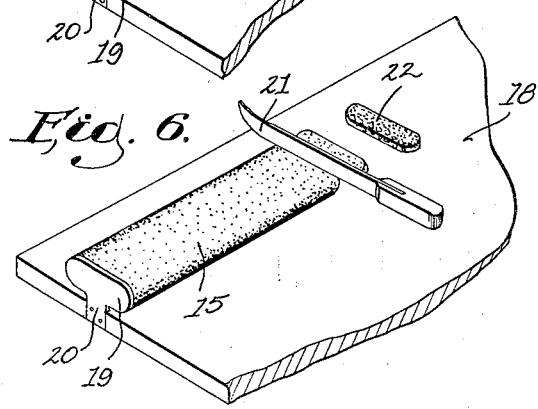
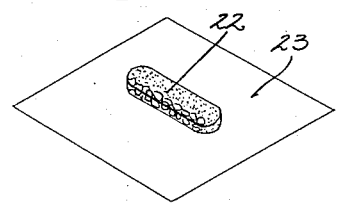
INVENTOR
Samuel Bucher
BY
Wheeler, Wheeler & Wheeler
ATTORNEYS Patented Aug. 15, 1939

2,169,485

UNITED STATES PATENT OFFICE 2,169,485

ICE CREAM MOLD

Samuel Bucher, Milwaukee, Wis.

Application May 17, 1937, Serial No. 143,011

1 Claim. (Cl. 107—19)

My invention relates to improvements in ice cream molds for making bars.

The object of my invention is to provide a new mold in which ice cream and fruit bars may be readily formed.

In the drawing:

Figure 1 is an isometric view of my improved mold including the end caps therefor.

Figure 2 is a section on line 2—2 of Fig. 1 and showing a full complement of ice cream in the mold.

Figure 3 is a view similar to Fig. 2 with the ice cream and fruit in position for final freezing in the mold.

Figure 4 is a view similar to Fig. 3 and showing the position of the main body of the mold when the end caps are removed.

Figure 5 is a perspective of a special work table equipped for removal of my frozen ice cream and fruit bar from the mold.

Figure 6 is a view similar to Fig. 5 and illustrating a process of cutting individual bars from the molded material.

Figure 7 shows the individual fruit and ice cream bar ready for packaging.

Figure 8 shows the completely packaged bar.

Like parts are designated by the same reference characters throughout the several views.

The mechanism of the mold

The mold in which I form my ice cream and fruit bar comprises three structural elements including a main body 10 and two end caps 11 and 12. The main body 10 of the mold is formed preferably of one sheet of somewhat resilient material such as copper, galvanized iron or one of the rust resisting metals such as Monel metal. In order that the resilience of the material of which the body 10 is formed may be most effective, I form the body as an ovoid in cross section and without definite crease lines or corners, the margins 13 being folded back merely to provide smooth, dull edges.

When the body 10 is not confined the side walls and the top portions spring to the position shown in Fig. 4, but when the mold is assembled with the end caps 11 and 12 in position as indicated in Figs. 2 and 3, the body is in restraint and its dimensions are limited to the size dictated by the caps.

The formation of the ice cream fruit bars

With the end caps 11 and 12 in position upon the body 10 of the mold a slot 14 between the margins 13 is open for the reception of partially frozen ice cream 15 which assumes a position as indicated in Fig. 2, since the ice cream in its partially frozen state is quite liquid. I purposely leave a space 16 in the upper portion of the mold for the reception of fruit 17 which is likewise inserted through the slot 14. The fruit is likewise pre-cooled and as it is placed upon the surface of the ice cream 15, the particles of fruit are embedded in the surface of the semi-liquid cream. The completely filled mold is then placed in a frigid temperature and solidly frozen whereby to bond the fruit to the ice cream and to bond the various particles of fruit to each other in the shape dictated by the mold.

When the fruit and ice cream are thoroughly congealed I remove the end caps 11 and 12 whereby to permit the body 10 of the mold to spring open as indicated in Fig. 4. Sometimes I find that a quick dash of comparatively warm water upon the surface of the mold is required to release the mold from the edible contents thereof. I then invert the mold as shown in Fig. 5 upon a work table 18 in conjunction with which I provide a templet or stop 19 which is shaped to the configuration of a cross section of the frozen mass of ice cream and fruit with a projected portion 20 by which the templet 19 may be secured to the work table 18.

As indicated by the arrow in Fig. 5, I then manually force the mass of ice cream and fruit in the mold 10 against the templet whereby to slidably force the edible contents out of the mold as indicated in Fig. 6, whereupon the long bar is in readiness for cutting with a knife 21 or other suitable implement so that individual ice cream and fruit bars 22 are formed. The thickness of the individual bars 22 is of course determined by the price at which the bar is to sell on the retail market.

Individual bars 22 are then placed upon a wrapper 23, as shown in Fig. 7, and enfolded therein, as shown in Fig. 8, to complete the final retail package.

I have thus formed a combination ice cream and fruit bar in which the fruit and the ice cream are readily shaped in, frozen in, and removed from a mold with a resulting individual bar in which the fruit is not mixed with the ice cream where the fruit flavor is concentrated rather than dispersed as it is formed in the intermediate stage shown in Fig. 2.

Likewise I have provided a mold which is readily opened for cleaning and is readily closed for the reception of the material to be molded. Furthermore, the mold is so devised as to naturally spring open and release the contents when the freezing operation is completed.

I claim:

A mold for food materials to be frozen, said mold including a bottom and side walls formed of resilient material, and ends walls provided with means to engage the bottom and side walls in confined position, the top margins of the side walls being spaced from each other when engaged by the end walls to provide space for inserting and working said food material, whereby upon removal of the end walls the side walls may spring away from solid contents of the mold.

SAMUEL BUCHER.

CERTIFICATE OF CORRECTION.

Patent No. 2,169,485. August 15, 1939.

SAMUEL BUCHER.

It is hereby certified that error appears in the printed specification of the above numbered patent requiring correction as follows: Page 1, second column, line 50, strike out the words "as it is formed in the intermediate stage shown"; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.